United States Patent [19]

Borst et al.

[11] 4,054,102
[45] Oct. 18, 1977

[54] DUAL CABLE STEERING SYSTEM

[75] Inventors: Gaylord M. Borst; Martin E. Larson, both of Waukegan, Ill.

[73] Assignee: Outboard Marine Corporation, Waukegan, Ill.

[21] Appl. No.: 688,672

[22] Filed: May 21, 1976

[51] Int. Cl.² ............................................. B63H 25/10
[52] U.S. Cl. ............................... 114/144 R; 74/480 B; 114/160; 115/18 R; 115/35
[58] Field of Search ............... 114/144 R, 144 A, 154, 114/160; 115/18 R, 41 R, 35; 74/480 B, 496, 501 R, 502, 506

[56] References Cited

U.S. PATENT DOCUMENTS

| 2,627,833 | 2/1953 | Schroeder | 114/160 |
|---|---|---|---|
| 2,826,090 | 3/1958 | Grinnell et al. | 74/480 B |
| 2,875,722 | 3/1959 | Post | 115/18 R |
| 2,961,986 | 11/1960 | Rockhill | 114/144 RM |
| 3,203,270 | 8/1965 | Booth | 114/160 |
| 3,269,351 | 8/1966 | Shimanckas | 115/18 R |
| 3,774,568 | 11/1973 | Borst et al. | 114/144 RM |
| 3,832,967 | 9/1974 | Waner et al. | 114/144 RM |

*Primary Examiner*—Trygve M. Blix
*Assistant Examiner*—Stuart M. Goldstein
*Attorney, Agent, or Firm*—Michael, Best & Friedrich

[57] ABSTRACT

Disclosed herein is a marine installation including a marine propulsion device including a transom bracket adapted to be fixed relative to a boat hull, a swivel bracket including spaced parallel apertures and mounted on the transom bracket for tilting movement about a tilt axis extending parallel to the apertures, a propulsion unit mounted from the swivel bracket for common tilting movement and for propulsion unit steering movement about a steering axis perpendicular to the tilt axis, a steering helm comprising a housing adapted to be fixed relative to the boat hull and a steering shaft mounted on the housing for rotation upon a fixed axis, a pair of flexible push-pull cables each including an outer casing having spaced first and second ends, and an inner core having a first end and a spaced second end portion extending through the respective apertures, first connections fixedly joining the outer casing first ends to the housing, second connections fixedly joining the inner core first ends to the steering shaft for common movement therewith, third connections fixedly joining the inner core second end portions to the propulsion unit for displacement thereof about the steering axis in response to the inner core movement, and fourth connections fixedly joining the outer casing second ends relative to the swivel bracket, one of the connections including a member which is adjustable so as to displace relative to each other one of the inner core and the outer casing of one of the push-pull cables so as to remove slack from the installation.

26 Claims, 8 Drawing Figures

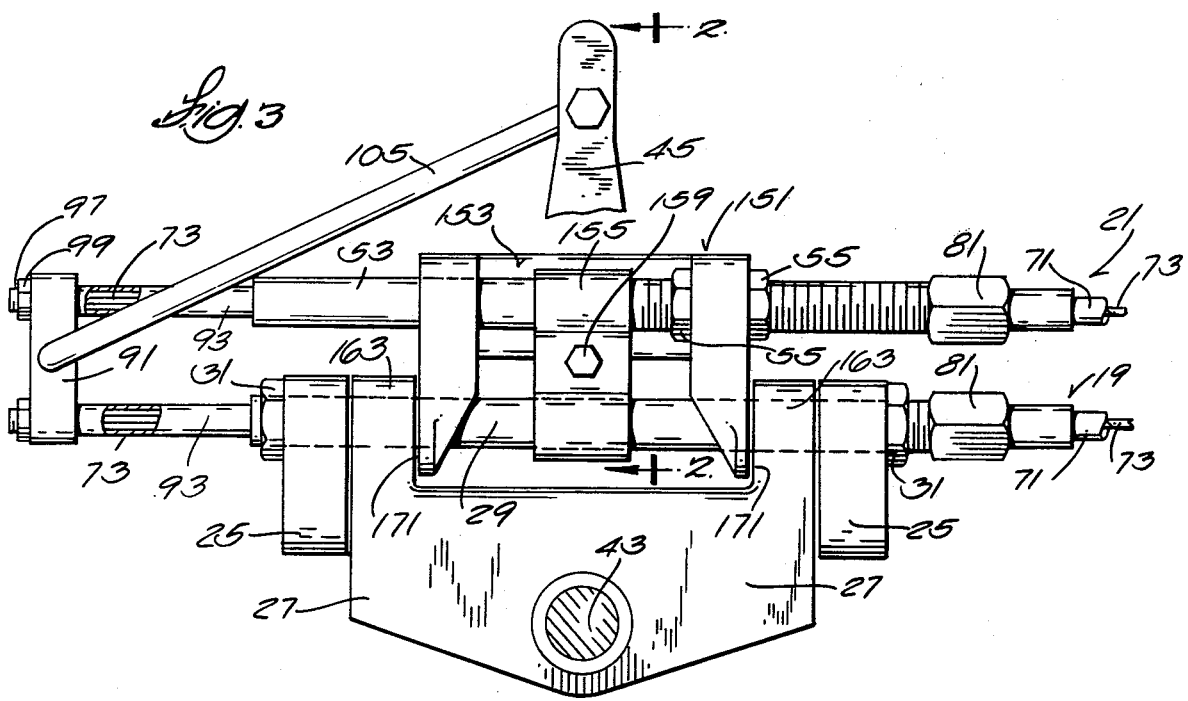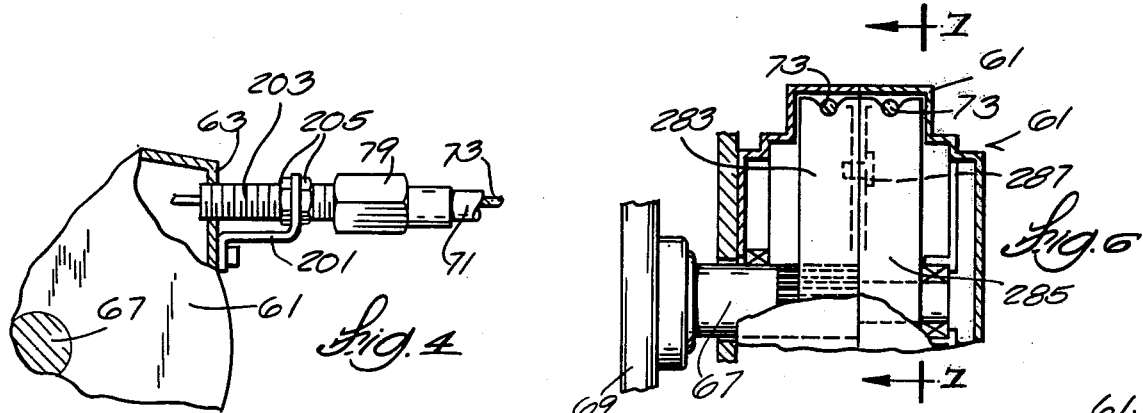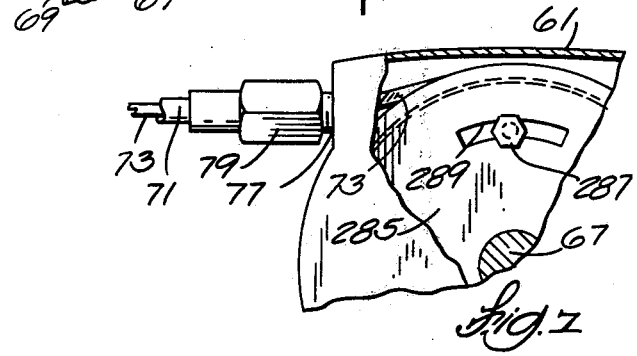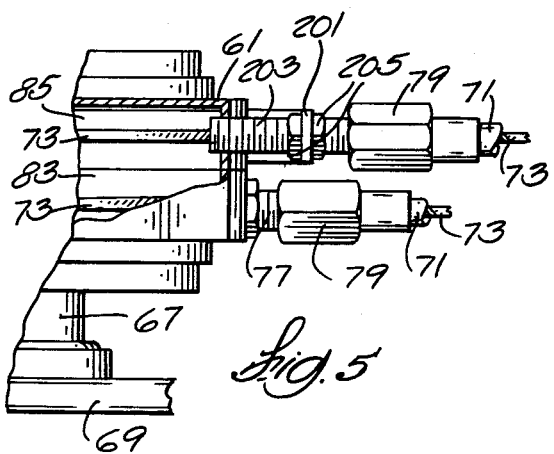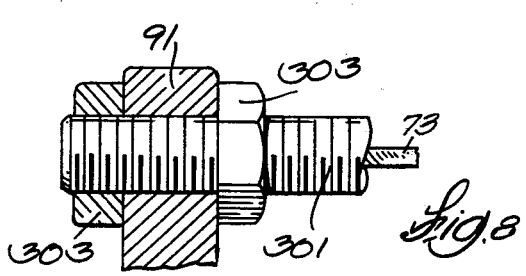

DUAL CABLE STEERING SYSTEM

BACKGROUND OF THE INVENTION

The invention relates generally to marine propulsion installations and more particularly to steering systems or arrangements for marine propulsion devices such as outboard motors and stern drive units. Still more particularly, the invention relates to steering arrangements including flexible push-pull cables having outer casings and inner cores.

The invention also relates to marine propulsion devices and to steering station or steering helm constructions.

Prior steering arrangements with flexible push-pull cables have generally suffered from slack or lost motion in the system, which slack or lost motion was particularly apparent when changing steering directions.

Attention is directed to the following United States Patents:

| | | |
|---|---|---|
| Post | 2,875,722 | issued March 3, 1959 |
| Hoover | 3,111,042 | issued November 19, 1963 |
| Nolen | 3,207,117 | issued September 21, 1965 |
| Borst | 3,774,568 | issued November 27, 1973 |

SUMMARY OF THE INVENTION

The invention provides a marine installation including a marine propulsion device including a first part adapted to be fixed relative to a boat hull, a second part including spaced parallel apertures, means mounting the second part from the first part for tilting movement about a tilt axis extending parallel to the apertures, a third part, and means mounting the third part from the second part for common tilting movement and for steering movement of the third part relative to the second part about a steering axis extending in a plane perpendicular to the tilt axis, a steering helm comprising a housing adapted to be fixed relative to the boat hull and a steering shaft mounted on the housing for rotation upon an axis fixed with respect to the housing, a first flexible push-pull cable including an outer casing having spaced first and second ends and an inner core having a first end and a spaced second end portion extending through one of the apertures, a second flexible push-pull cable including an outer casing having first and second ends and an inner core having a first end and a spaced second end portion extending through the other of the apertures, means fixedly connecting the first ends of the outer casings to the housing, means fixedly connecting the first ends of the inner cores to the steering shaft for common movement of the inner cores relative to the outer casings in response to rotation of the steering shaft, means fixedly connecting the second end portions of the inner cores and to the third part for displacing the third part about the steering axis in response to movement of the inner cores relative to the casings, and means fixedly connecting the second ends of the outer casings relative to the second part, one of the connecting means including means for adjustably displacing relative to each other one of the inner core and the outer casing of one of the push-pull cables so as to remove slack from the installation.

The invention also provides a marine propulsion device including a first part adapted to be fixed relative to a boat hull, a second part including spaced parallel apertures, means mounting the second part from the first part for tilting movement about a tilt axis extending parallel to the apertures, a third part, and means mounting the third part from the second part for common tilting movement and for steering movement of the third part relative to the second part about a steering axis extending in a plane perpendicular to tilt axis.

In accordance with an embodiment of the invention, the marine propulsion device referred to in the preceding paragraph forms a part of a marine steering installation which also includes a first flexile push-pull cable including an outer casing and an inner core extending through one of the apertures, a second flexible push-pull cable including an outer casing and an inner core extending through the other of the apertures, means fixedly connecting the inner cores to the third part for displacing the third part about the steering axis in response to movement of the inner cores in the apertures, and means fixedly connecting the outer casings relative to the second part, one of the connecting means including means for adjustably displacing relative to each other one of the inner core and the outer casing of one of the push-pull cables so as to remove slack from the installation.

In one embodiment of the invention, the first part of the marine propulsion device is a transom bracket, the second part is a swivel bracket, and the third part is a propulsion unit.

In one embodiment of the invention, one of the apertures is coaxial with the tilt axis and is provided by a tilt tube.

In one embodiment of the invention, the second part of the marine propulsion device includes a bracket portion having therein one of the apertures and the other aperture is provided by a hollow tilt tube mounting the second part from the first part for tilting movement, which tilt tube is fixed against axial movement relative to the second part.

In one embodiment of the invention, the bracket portion extends unitarily from the second part for common movement therewith.

In one embodiment of the invention, the bracket portion is physically separate from the second part, and the marine propulsion device also includes means carrying the adjustment tube from the second part, and interengaging means on the bracket and on the second part for preventing relative movement between the second part and the bracket portion in the direction parallel to the tilt axis.

In one embodiment of the invention, the carrying means comprises a clamp.

The invention also provides a marine steering helm comprising a housing adapted to be fixed relative to a boat hull and including opposite sides, a steering shaft mounted on the housing for rotation upon an axis fixed with respect to the housing, means on one of the opposite sides adapted for fixedly connecting to the housing the outer casings of a pair of flexible push-pull cables, and means on the steering shaft adapted for fixedly connecting to the steering shaft the inner cores of the pair of flexible push-pull cables so as to afford common movement of the inner cores relative to the outer casings in response to rotation of the steering shaft, one of the connecting means including means for adjustably displacing relative to each other one of the inner core and the outer casing of one of the pair of push-pull cables.

In one embodiment of the invention, the steering helm housing includes spaced opposing sides and the casings are fixedly connected to one of the spaced opposing sides.

In one embodiment of the invention, the adjustable displacing means comprises an adjustment tube having an outer surface, aperture means on one of the marine propulsion device and the steering helm through which the adjustment tube extends, and lock means on the outer surface of the adjustment tube in operative engagement with the one of the marine propulsion device and the steering helm.

In one embodiment of the invention, the adjustment tube is fixedly connected to one of the inner cores. In accordance with another embodiment, the adjustment tube is fixedly connected to one of the outer casings.

In one embodiment of the invention, the adjustable displacing means is included in the steering helm and comprises anchor means adapted for connection to the one of the inner core and the outer casing of the one flexible push-pull cable, and means for adjusting the distance of the anchor means relative to the assoicated one of the steering shaft and the housing.

In one embodiment of the invention, the adjustable displacing means is included in the steering helm and comprises a first member fixed to the steering shaft for common rotation therewith and fixed to one of the inner cores and a second member fixed to the other of the inner cores and movable relative to the first member, and means for adjustably fixing together the first and second members.

One of the principal features of the invention is the provision of a marine propulsion installation including a steering arrangement or system which employs a pair of flexible push-pull cables and which substantially eliminates slack or lost motion in the steering system.

Another of the principal features of the invention is the provision of a marine steering arrangement or system including dual flexible push-pull cables which extend in generally parallel relation to each other and which are assembled to a marine propulsion device and to a steering station or helm so as to substantially remove slack from the system.

Another of the principal features of the invention is the provision of a marine propulsion device which is adapted for use in a dual, flexible push-pull cable steering system which substantially reduces or eliminates lost motion and slack.

Another of the principal features of the invention is the provision of a steering station or steering helm which is adapted for use in a dual, push-pull flexible cable steering system which substantially reduces or eliminates lost motion or slack in the system.

Other features and advantages of the embodiments of the invention will become known by reference to the following general description, claims, and appended drawings.

IN THE DRAWINGS

FIG. 3 is a fragmentary view, partially broken away, and in section of a modified marine propulsion device which can be incorporated in the marine propulsion installation shown in FIG. 1.

FIG. 4 is a fragmentary side elevational view of a modified steering helm or station which can be employed in a marine propulsion installation such as shown in FIG. 1.

FIG. 5 is a fragmentary top view of the modified steering station shown in FIG. 4.

FIG. 6 is a fragmentary side elevational view, with parts broken away and in section, of another modified steering station which can be employed in a marine propulsion installation such as shown in FIG. 1.

FIG. 7 is a fragmentary view, with parts broken away and in section, taken along lines 7—7 of FIG. 6.

FIG. 8 is a view partially in section of a modified arrangement for connecting the core of a flexible push-pull cable to a marine propulsion device, which arrangement can be used in a marine propulsion installation such as shown in FIG. 1.

Figure 1:
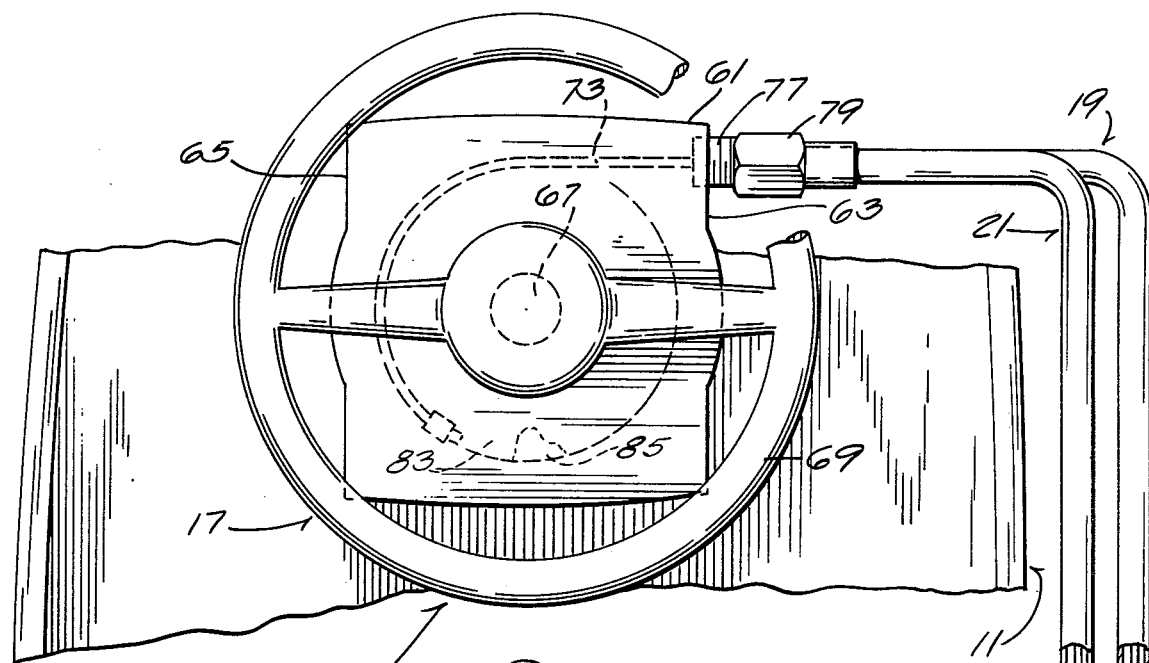
FIG. 1 is a schematic view of a boat incorporating a marine propulsion installation incorporating various of the features of the invention.

Before explaining the embodiments of the invention in detail, it is to be understood that the invention is not limited in its application to the details set forth in the following description or illustrated in the drawings. The invention is capable of other embodiments and of being practiced and carried out in various ways. Alos, it is to be understood that the phraseology and terminology employed herein is for the purposes of description and should not be regarded as limiting.

GENERAL DESCRIPTION

Shown in FIG. 1 of the drawings is a fragmentarily illustrated boat 11 equipped with a marine propulsion installation 13 incorporating various of the features of the invention. The marine propulsion installation 13 includes a marine propulsion device 15, a steering helm or station 17, and a pair of flexible push-pull cables 19 and 21 extending between the marine propulsion device 15 and the steering helm or station 17.

More specifically, the illustrated marine propulsion device 15 is in the form of an outboard motor and includes a first part 25 which is in the form of a transom bracket and which is adapted to be fixedly connected to the boat hull 11 in a conventional manner.

The marine propulsion device 15 also includes a second part 27 which is in the form of a swivel bracket and which is tiltably connected to the first part or transom bracket 25 by means including a hollow tilt tube 29 which extends through aligned apertures in the transom bracket and in the swivel bracket. Means in the form of nuts 31 are secured on the opposite ends of the tilt tube 29 to maintain the tilt tube 29, swivel bracket 27 and transom bracket 25 in assembled relation and to prevent relative movement therebetween axially of the tilt tube 29.

The marine propulsion device 15 also includes a fragmentarily illustrated third part 35 in the form of a propulsion unit which comprises a fragmentarily illustrated power head 37 including an internal combustion engine (not shown) and a fragmentarily illustrated lower unit 39 including a propeller 41 driven by the engine and normally located under water.

The propulsion unit 35 is connected to the swivel bracket 27 for common tilting movement and for steering movement relative to the swivel bracket 27 about means in the form of a king pin 43 extending from the propulsion unit 35 and having an axis extending in a plane perpendicular to the axis of the tilt tube 29. Also extending from the propulsion unit 35 is a steering arm 45 having common steering movement with the propulsion unit 35.

Extending fixedly from the swivel bracket 27 forwardly of the tilt tube 29 is one or more portions 51 which respectivly includes apertures extending in parallel relation to the axis of the tilt tube 29 and aligned with respect to one another. Extending in the apertures is a hollow adjustment tube 53. Means are provided for adjustably fixing the adjustment tube 53 relative to the portion or portions 51 of the swivel bracket 27. In the illustrated construction, such means comprises an external thread on the adjustment tube 53 and a pair of lock nuts 55 which are mounted on the thread and engagable with opposite sides of one of the portions 51 so as to permit fixing of the adjustment tube 53 in axially adjusted position on the swivel bracket 27.

The steering helm or station 17 includes a suitable frame or housing 61 which is adapted to be fixedly mounted on the boat hull 11 and which includes a pair of opposite sides 63 and 65. Carried by the housing 61 for rotation about a fixed axis is a steering shaft 67 which, in turn, and exteriorly of the housing 61, carries a steering wheel 69.

The flexible push-pull cables 19 and 21 are generally of identical construction and each includes an outer sheath or casing 71 and an inner core 73 movable lengthwise within the outer casing 71.

Means are provided for fixedly connecting the outer casings 71 of the flexible push-pull cables 19 and 21 to the steering housing 17 and to the tilt tube 29 and adjustment tube 53 of the marine propulsion device 15. In this regard, while various other arrangments can be employed, the steering station 17 includes two adjacent hollow nipples 77 mounted on the side 63 of the housing 61 and including external threads. In addition, each of the outer casings 71 carries, at the adjacent end thereof, a female socket 79 which is threadedly engaged on one of the nipples 77 to fixedly connect the outer casings 71 to the steering housing 61.

At their other ends, the outer casings 71 also include female sockets 81 which can be threadedly engaged on threaded end portions of the tilt tube 29 and adjustment tube 53 so as to fix the outer casings 71 to the tilt tube 29 and adjustment tube 53. It is noted that, when the installation is completed, the ends of the outer casings 71 adjacent to the steering station 17 are fixed relative to the steering station 17 and therefore relative to each other. It is further noted that when the installation 13 is completed, the ends of the outer casings 71 adjacent to the tilt tube 29 and adjustment tube 53 are fixed relative to the tilt tube 29 and the adjustment tube 53. It is further noted that, when the installation 13 is completed and adjustment has been made to remove the slack from the installation, the tilt tube 29 and adjustment tube 53 are also fixed relative to each other, thereby fixing the assoicated ends of the outer casings of the flexible cables 19 and 21 relative to each other.

Means are provided for fixing the inner cores of the flexible push-pull cables 19 and 21 to the steering shaft 67 so that rotation of the steering shaft causes common movement of the inner cores 73 through the nipples 77 and in the outer casings 71. In the construction illustrated in FIG. 1, such means comprises dual disks 83 and 85 fixed on the steering shaft 67 and fixed connection of the ends of the inner cores 73 to the disks 83 and 85 and thus relative to each other.

Means are also provided for fixedly connecting the inner core ends or end portions to the third part or propulsion unit 35 for displacing the third part or propulsion unit about the steering axis in response to movement of the inner cores relative to the outer casings. In this regard, at their other ends, the inner cores 73 of the flexible push-pull cables 19 and 21 extend respectively through the tilt tube 29 and the adjustment tube 53. At their free ends, the inner cores 73 are respectively fixedly connected to the interior of a pair of protective sleeves or shields 93 which, in turn, are fixedly connected to a cross head 91.

More particularly, the sleeves or shields 93 include shoulders 95 which engage one side of the cross head 91 and end portions 97 which extends through the cross head 91 and which are threaded. Fixed on the end portions 97 are respective nuts 99, which, in effect, fixedly secure the inner cores 73 to the cross head 91. In order to enclose the ends of the inner core 73, the protective sleeves or shields 93 extend respectively into the tilt tube 29 and adjustment tube 53 for telescopic movement therein in response to movement of the cross head 91 relative to the tubes 29 and 53.

In turn, the cross head 91 is connected to the propulsion unit 35 to effect steering movement thereof in response to movement of the inner cores 73 in the tubes 29 and 53 and accompanying movement of the cross head 91. In the illustrated construction, an L shaped steering link 105 has one end pivotally connected to the steering arm 45 and the other end pivotally connected to the cross head 91 about an axis parallel to the axis of pivotal connection with the steering arm 45.

In assembly of the installation 13, after connection of the outer casings 71 of the flexible cables 19 and 21 to the steering station housing 61 and connection of the inner cores 73 to the steering shaft 67, and after connection of the inner cores 73 to the cross head 91 and connection of the outer casings 71 to the tilt tube 29 and adjustment tube 53, the adjustment tube 53 is moved axially so as to displace the outer casing 71 relative to the inner core 73 of the cable 21, and thereby to remove any slack or free play between the inner cores 73 and outer casings 71 of the flexible push-pull cables 19 and 21. The adjustment tube 53 can be moved so as to place one of the outer casings 71 in tension and the other of the outer casings 71 in compression. Accordingly, when thus assembled, rotation of the steering wheel 69 in one direction will cause movement of the inner cores 73 through the tubes 29 and 53 so as to move the cross head 91 and thereby to swing the propulsion unit 35 in one direction. Opposite movement of the steering wheel 69 will effect opposite movement of the propulsion unit 35. Because of the dual cables 19 and 21 and the adjustability of the adjustment tube 53 relative to the marine propulsion device 15, any free play or slack can be removed from the installation or system 13 so that immediate steering occurs in response to changes in the direction of steering.

While the disclosure has been illustrated with an outboard motor, the features of the invention are also applicable to stern drive units.

Figure 2:
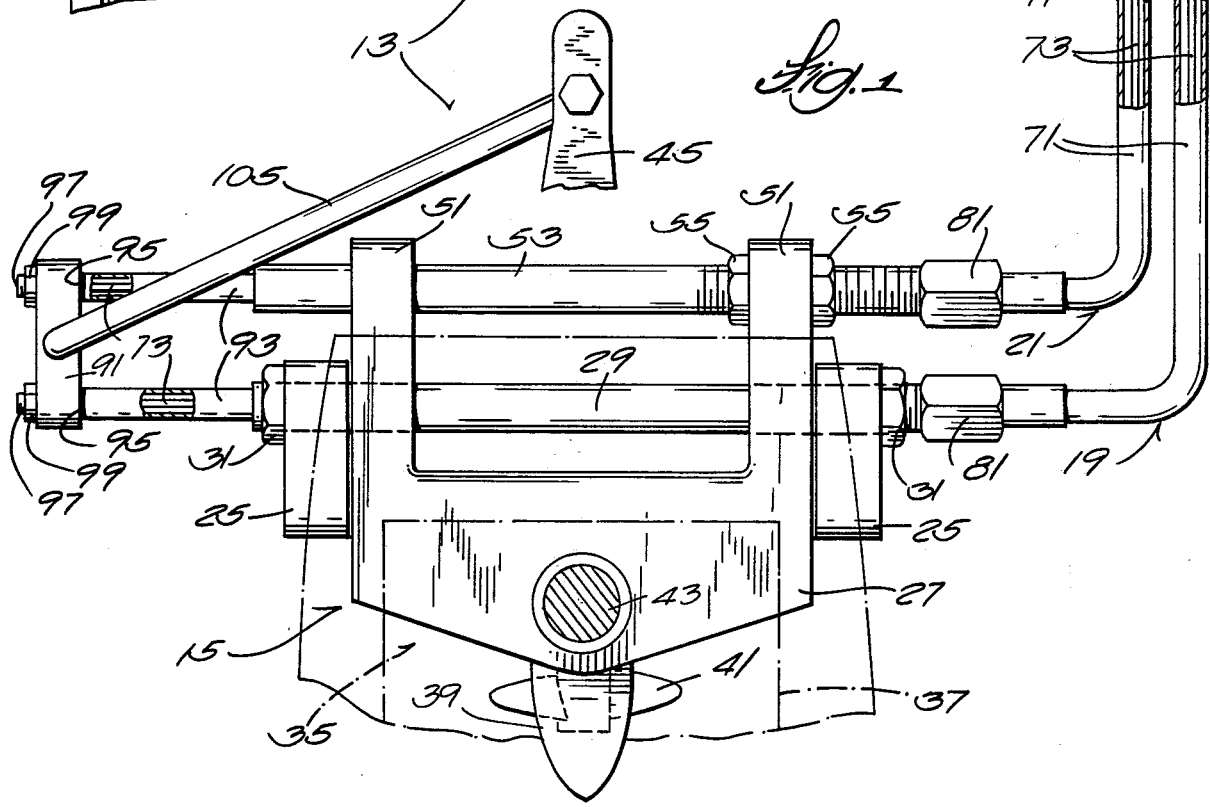
FIG. 2 is a fragmentary sectional view taken along lines 2—2 of FIG. 3.
Figure 2:
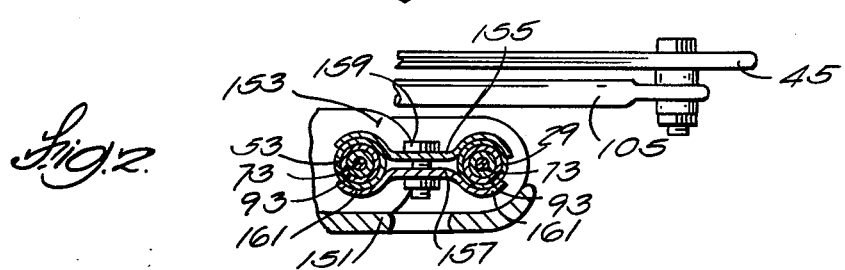

Shown in FIGS. 2 and 3 is another embodiment of the invention in which the swivel bracket 27 does not include portions extending integrally therefrom for support of the adjustment tube 53. Instead, in the embodiment shown in FIGS. 2 and 3, an adjustment tube holding bracket 151 is fixed relative to the swivel bracket 27 by a clamp 153. More specifically, in the construction shown in FIGS. 2 and 3, the clamp 153 is provided by upper and lower clamping members connected by a screw or bolt 159. Each of the clamping members includes, at each end, a C shaped portion 161 adapted to engage the upper or lower surfaces of the tilt tube 29 or adjustment tube 53 and, when the bolt is tightened, to tightly engage together the assembly of the tilt tube 29, clamp 153, and adjustment tube 52. (It is noted that in the conventional construction, the swivel bracket 27 includes two axially spaced portions 163 through which the tilt pin or tube 29 extends, leaving the tilt tube 29 exposed between such portions).

As the adjustment tube 53 extends through the bracket 151, the bracket 151 is also thereby positioned relative to the swivel bracket 27. In this connection, the bracket 151 shown in FIG. 2 includes two spaced arms 171 which extend rearwardly for engagement with the inside surfaces of the swivel bracket portions 163 so as to prevent relative movement therebetween in the axial direction of the tubes 29 and 53.

In assembling the arrangement shown in FIGS. 2 and 3, the clamp 153 is initially tightened only sufficiently to generally hold the adjustment tube 53 in parallel relation to the tilt tube 29 while permitting axial movement of the adjustment tube 53 relative to the clamping members 155 and 157. When thus sufficiently tightened, the arms 171 of the bracket 151 are located for engagement with the swivel bracket portions 163 due to projection of the adjustment tube 53 in the bracket 151. Thereafter, the adjustment tube 53 is axially adjusted relative to the bracket 151 and thereby relative to the tilt tube 29 to remove free play in the flexible push-pull cables 19 and 21. When such free play or slack is removed, the adjustment tube 53 is fixed relative to the bracket 151 in adjusted position by operation of the pair of lock nuts 55. Thereafter, the screw or bolt 159 is further tightened to tightly secure together the assembly of the bracket 151, the adjustment tube 53, the swivel bracket 27, and the tilt tube 29.

Arrangements other than as shown in FIGS. 1 through 3 can also be employed for removing the slack from a dual flexible push-pull cable installation as shown in FIGS. 1 through 3. For instance, instead of adjusting the connection of the outer sheath 71 of one of the flexible push-pull cables 19 and 21 to the associated one of the tubes 29 and 53, if desired, adjustment of the connection of one of the outer sheaths 71 to the steering helm or station 17 can be employed. Thus, as shown in FIGS. 4 and 5, the outer sheath 73 of one of the flexible push-pull cables 19 and 21 is adjustably connected to the housing 61. More particularly, the housing 61 has fixed thereon a bracket 201 having therein an aperture receiving an adjustably located anchor means or adjustment tube 203. In a fashion similar to that already described, the adjustment tube 203 is threaded on its exterior for connection to the threaded coupling 79 at the adjacent end of the outer sheath 73. After such connection, the adjustment tube 203 is displaced axially through the aperture in the bracket 201 to remove slack from the installation and then locked in adjusted position relative to the housing 61 by a pair of lock nuts 205 rotatable on the threaded outer surface of the adjustment tube 203 and located on opposite sides of the bracket 201. Preferably, the adjustment tube 203 is of sufficient length so that it extends through the adjacent side wall 63 of the housing 61 when in the adjusted position.

Instead of adjustable connection of one of the outer sheaths 73 to one of the marine propulsion device 15 or the steering helm or station 17, if desired, the adjustment to remove slack from a dual push-pull cable installation such as shown in FIG. 1 can be accomplished by adjusting the inner cores 73 relative to the steering shaft 67 or relative to the cross head 91. More specifically, in the construction shown in FIG. 6 and 7, the connection of the inner core 73 of one of the flexible push-pull cables 19 and 21 relative to the steering shaft 67 is adjusted relative to the connection of the inner core 73 of the other one of the flexible push-pull cables 19 and 21 so as to remove slack in the installation. Still more specifically, in the construction disclosed in FIGS. 6 and 7, the inner cores 73 are respectively anchored in any suitable fashion to members which can be in the form of disks 283 and 285. The disk 283 is splined or keyed to the steering shaft, while the disk 285 is rotatable on the steering shaft 67 in adjacent relation to the disk 283 and relative to both the steering shaft 67 and the disk 283. As a result, the disk 285 can be angularly displaced relative to the disk 283 and to the steering shaft 67 so as to remove slack from the installation. When the disks 283 and 285 are angularly adjusted so as to remove such slack, the disks 283 and 285 can be locked in adjusted position for common rotation with each other and with the steering shaft 67 by a headed nut or bolt 287 which extends through an arcuate slot 289 in the disk 285 and is threaded into the disk 283. Of course, either inner core 73 can be thus adjusted relative to the other.

Shown in FIG. 8 is still another arrangement for removing slack from a dual push-pull cable installation such as shown in FIG. 1, which arrangement can be used in lieu of any of the previously described constructions. In the construction shown in FIG. 8, the inner core 73 of one of the flexible push-pull cables 19 and 21 is adjustably connected to the cross head so as to remove slack from the installation. In particular, as shown in FIG. 8, the inner core 73 is suitably anchored or fixedly connected to the inside of an adjustably locatable anchor means or adjustment tube 301 which also serves as a shield similar to the shield 93 employed in the construction shown in FIG. 1. However, in the construction shown in FIG. 8, the adjustment tube 301 can be adjusted axially through the associated opening in the cross head 91 to remove slack in the installation system. In this regard, the outer surface of the adjustment tube 301 is threaded so as to permit adjustment of opposed lock nuts 303 against opposite sides of the cross head 91 to anchor the adjustment tube 301 and connected inner core 73 to the cross head 91 in adjusted position and with the slack removed from the installation.

Thus the invention encompasses adjustable connection of the inner core 73 of either one of the flexible push-pull cables 19 and 21 either to the steering wheel 69 or to the cross head 91 of the marine propulsion device 15, or adjustable connection of the outer sheath 71 of either one of the flexible push-pull cables 19 and 21 either to the marine propulsion device 15 or the steering station housing 61. Such adjustable connection affords removal of slack in the disclosed dual flexible cable installation so as thereby to afford immediate steering response incident to a change in the direction of steering.

Various of the features of the invention are set forth in the following claims.

What is claimed is:

1. A marine installation including a marine propulsion device including a first part adapted to be fixed relative to a boat hull, a second part including spaced parallel apertures, means mounting said second part to said first part for tilting movement about a tilt axis extending parallel to said apertures, a third part, and means mounting said third part to said second part for common tilting movement and for steering movement of said third part relative to said second part about a steering axis extending in a plane perpendicular to the tilt axis, a steering helm comprising a housing adapted to be fixed relative to the boat hull and a steering shaft mounted on said housing for rotation upon an axis fixed with respect to said housing, a first flexible push-pull cable including an outer casing having spaced first and second ends and an inner core having a first end and a spaced second end portion extending through one of said apertures, a second flexible push-pull cable including an outer casing having first and second ends and an inner core having a first end and a spaced second end portion extending through the other of said apertures, means fixedly connecting said first ends of said outer casings to said housing, means fixedly connecting said first ends of said inner cores to said steering shaft for common movement of said inner cores relative to said outer casings in response to rotation of said steering shaft, means fixedly connecting said second end portions of said inner cores to said third part for displacing said third part about the steering axis in response to movement of said inner cores relative to said casings, and means fixedly connecting said second ends of said outer casings relative to said second part, one of said connecting means including means for adjustably displacing relative to each other one of said inner core and said outer casing of one of said push-pull cables so as to remove slack from said installation.

2. A marine installation in accordance with claim 1 wherein one of said apertures is coaxial with the tilt axis and is provided by a tilt tube.

3. A marine installation in accordance with claim 1 wherein said adjustable displacing means comprises an adjustment tube having an outer surface, aperture means on one of said marine propulsion device and said steering helm through which said adjustment tube extends, and lock means on said outer surface of said adjustment tube in operative engagement with said one of said marine propulsion device and said steering helm.

4. A marine installation in accordance with claim 3 wherein said adjustment tube is fixedly connected to one of said inner cores.

5. A marine installation in accordance with claim 3 wherein said adjustment tube is fixedly connected to one of said outer casings.

6. A marine installation in accordance with claim 1 wherein said adjustable displacing means comprises a first member fixed to said steering shaft for common rotation therewith and fixed to one of said inner cores and a second member fixed to the other of said inner cores and movable relative to said first member, and means for adjustably fixing together said first and second members.

7. A marine propulsion installation including a marine propulsion device comprising a first part adapted to be fixed relative to a boat hull, a second part including spaced parallel apertures, means mounting said second part to said first part for tilting movement about a tilt axis extending parallel to said apertures, a third part, and means mounting said third part to said second part for common tilting movement and for steering movement of said third part relative to said second part about a steering axis extending in a plane perpendicular to the tilt axis, a first flexible push-pull cable including an outer casing and an inner core extending through one of said apertures, a second flexible push-pull cable including an outer casing and an inner core extending through the other of said apertures, means fixedly connecting said inner cores to said third part for displacing said third part about the steering axis in response to movement of said inner cores in said apertures, and means fixedly connecting said outer casings relative to said second part, one of said connecting means including means for adjustably displacing relative to each other one of said inner core and said outer casing of one of said push-pull cables so as to remove slack from the installation.

8. A marine propulsion installation in accordance with claim 7 wherein one of said apertures is coaxial with the tilt axis and is provided by a tilt tube.

9. A marine propulsion installation in accordance with claim 7 wherein said adjustable displacing means comprises an adjustment tube having an outer surface, aperture means on said marine propulsion device through which said adjustment tube extends, and lock means on said outer surface of said adjustment tube in operative engagement with said marine propulsion device.

10. A marine installation in accordance with claim 7 wherein said adjustment tube is fixedly connected to one of said inner cores.

11. A marine installation in accordance with claim 7 wherein said adjustment tube is fixedly connected to one of said outer casings.

12. A marine propulsion installation in accordance with claim 7 including a steering helm comprising a housing adapted to be fixed relative to the boat hull, a steering shaft mounted on said housing for rotation upon an axis fixed with respect to said housing, means fixedly connecting said outer casings to said first and second push-pull cables to said housing, and means fixedly connecting said inner cores of said first and second push-pull cables to said steering shaft for common movement of said inner cores in response to rotation of said steering shaft.

13. A marine propulsion installation including a marine propulsion device comprising a first part adapted to be fixed relative to a boat hull, a second part including a bracket portion having therein an aperture with an axis, means including a hollow tilt tube mounting said second part to said first part for tilting movement about a tilt axis extending parallel to said aperture axis and through said hollow tilt tube, said tilt tube being fixed against axial movement relative to said second part, a third part, and means mounting said third part to said second part for common tilting movement and for steering movement of said third part relative to said second part about a steering axis extending in a plane perpendicular to the tilt axis, a hollow adjustment tube extending in said aperture, a first flexible push-pull cable including an outer casing fixed to said tilt tube and an inner core extending through said tilt tube, a second flexible push-pull cable including an outer casing fixed to said adjustment tube, means fixedly connected to said inner cores of said first and second push-pull cables and to said third part for displacing said third part about the steering axis in response to movement of said inner cores in said tubes, and means for axially adjustably fixedly connecting said adjustment tube relative to said second part.

14. A marine propulsion installation in accordance with claim 13 including a steering helm comprising a housing adapted to be fixed relative to the boat hull, a steering shaft mounted on said housing for rotation upon an axis fixed with respect to said housing, means fixedly connecting said outer casings of said first and second push-pull cables to said housing, and means fixedly connecting said inner cores of said first and second push-pull cables to said steering shaft for common movement of said inner cores in response to rotation of said steering shaft.

15. A marine propulsion installation in accordance with claim 13 wherein said first part is a transom bracket, wherein said second part is a swivel bracket, and wherein said third part is a propulsion unit.

16. A marine propulsion installation in accordance with claim 13 wherein said bracket portion is physically separate from said second part, and wherein said installation further includes means carrying said adjustment tube from said second part, and interengaging means on said bracket portion and on said second part for preventing relative movement between said second part and said bracket portion in the direction parallel to the tilt axis.

17. A marine propulsion installation in accordance with claim 16 wherein said carrying means comprises a clamp.

18. A marine propulsion installation in accordance with claim 13 wherein said bracket portion extends unitarily from said second part for common movement therewith.

19. A marine propulsion device including a first part adapted to be fixed relative to a boat hull, a second part including spaced parallel apertures, means mounting said second part to said first part for tilting movement of said second part relative to said first part about a tilt axis extending parallel to said apertures, a third part, and means mounting said third part to said second part for common tilting movement with said second part and for steering movement of said third part relative to said second part about a steering axis extending in a plane perpendicular to the tilt axis.

20. A marine propulsion device in accordance with claim 19 wherein one of said apertures is coaxial with the tilt axis and is provided by a tilt tube.

21. A marine propulsion device in accordance with claim 19 wherein said device is an outboard motor, wherein said first part is a transom bracket, wherein said second part is a swivel bracket, and wherein said third part is a propulsion unit.

22. A marine steering installation including a steering helm comprising a housing adapted to be fixed relative to a boat hull, a steering shaft mounted on said housing for rotation upon an axis fixed with respect to said housing, a first flexible push-pull cable adapted to be connected to a marine propulsion device and including an outer casing and an inner core, a second flexible push-pull cable adapted to be connected to the marine propulsion device and including an outer casing and an inner core, means fixedly connecting said outer casings to said housing, and means fixedly connecting said inner cores to said steering shaft for common movement of said inner cores relative to said outer casings in response to rotation of said steering shaft, one of said connecting means including means for adjustably displacing relative to each other one of said inner core and outer casing of one of said push-pull cables independently of the other of said cables so as to remove slack from said installation.

23. A marine steering installation in accordance with claim 22 wherein said housing includes spaced opposing sides and wherein said casings are fixedly connected to one of said spaced opposing sides.

24. A marine steering helm comprising a housing adapted to be fixed relative to a boat hull and including opposite sides, a steering shaft mounted on said housing for rotation upon an axis fixed with respect to said housing, means on one of said opposite sides adapted for fixedly connecting to said housing the outer casings of a pair of flexible push-pull cables, and means on said steering shaft adapted for fixedly connecting to said steering shaft the inner cores of the pair of flexible push-pull cables so as to afford common movement of the inner cores relative to the outer casings in response to rotation of said steering shaft, one of said connecting means including means for adjustably displacing relative to each other one of the inner core and the outer casing of one of the pair of push-pull cables independently of the other of said cables.

25. A marine steering helm in accordance with claim 24 wherein said adjustable displacing means comprises anchor means adapted for connection to the one of the inner core and the outer casing of the one flexible push-pull cable, and means for adjusting the distance of said anchor means relative to the associated one of said steering shaft and said housing.

26. A marine steering helm in accordance with claim 25 wherein said adjustable displacing means comprises a first member fixed to said steering shaft for common rotation therewith and adapted to be fixed to one of the inner cores and a second member adapted to be fixed to the other of the inner cores and movable relative to the first member, and means for adjustably fixing together the first and second members.

* * * * *

UNITED STATES PATENT AND TRADEMARK OFFICE
CERTIFICATE OF CORRECTION

PATENT NO. : 4,054,102
DATED : October 18, 1977
INVENTOR(S) : Gaylord M. Borst and Martin E. Larson It is certified that error appears in the above-identified patent and that said Letters Patent are hereby corrected as shown below:

Column 1, line 56　　　　　　　　　　delete "and"

Column 10, line 32　　　　　　　　　 delete "to", insert ---of---.

Signed and Sealed this

Second Day of October 1979

[SEAL]

Attest:

RUTH C. MASON
*Attesting Officer*

LUTRELLE F. PARKER
*Acting Commissioner of Patents and Trademarks*